(12) United States Patent
Hirai et al.

(10) Patent No.: US 7,584,012 B2
(45) Date of Patent: Sep. 1, 2009

(54) AUTOMATIC DEFECT REVIEW AND CLASSIFICATION SYSTEM

(75) Inventors: Takehiro Hirai, Ushiku (JP); Kazuo Aoki, Hitachinaka (JP); Kenji Obara, Kawasaki (JP)

(73) Assignee: Hitachi High-Technologies Corporation, Tokyo (JP)

( * ) Notice: Subject to any disclaimer, the term of this patent is extended or adjusted under 35 U.S.C. 154(b) by 37 days.

(21) Appl. No.: 11/892,583

(22) Filed: Aug. 24, 2007

(65) Prior Publication Data

US 2008/0004742 A1    Jan. 3, 2008

Related U.S. Application Data

(63) Continuation of application No. 11/451,330, filed on Jun. 13, 2006.

(30) Foreign Application Priority Data

Jun. 13, 2005    (JP) .............................. 2005-172808

(51) Int. Cl.
*G06F 19/00* (2006.01)
*G06K 9/00* (2006.01)

(52) U.S. Cl. .................. 700/110; 700/121; 702/35; 702/185; 382/149; 382/224

(58) Field of Classification Search ......... 700/108–110, 700/121; 702/35, 182–185; 382/145, 149, 382/224; 438/14, 16
See application file for complete search history.

(56) References Cited

U.S. PATENT DOCUMENTS

| | | | |
|---|---|---|---|
| 5,544,256 A * | 8/1996 | Brecher et al. .............. 382/149 |
| 6,177,287 B1 | 1/2001 | Steffan et al. | |
| 6,185,511 B1 | 2/2001 | Steffan et al. | |
| 6,259,960 B1 | 7/2001 | Inokuchi | |
| 6,408,219 B2 | 6/2002 | Lamey et al. | |
| 6,438,438 B1 | 8/2002 | Takagi et al. | |
| 6,456,899 B1 | 9/2002 | Gleason et al. | |
| 6,483,938 B1 | 11/2002 | Hennessey et al. | |
| 6,519,357 B2 | 2/2003 | Takeuchi | |
| 6,542,830 B1 | 4/2003 | Mizuno et al. | |
| 6,922,482 B1 | 7/2005 | Ben-Porath | |
| 7,034,298 B2 | 4/2006 | Miyai et al. | |
| 7,062,081 B2 | 6/2006 | Shimoda et al. | |
| 7,113,628 B1 | 9/2006 | Obara et al. | |
| 2002/0171051 A1 * | 11/2002 | Nakagaki et al. .......... 250/559.4 |
| 2002/0181757 A1 | 12/2002 | Takeuchi | |
| 2004/0188609 A1 | 9/2004 | Miyai et al. | |
| 2004/0234120 A1 | 11/2004 | Honda et al. | |

FOREIGN PATENT DOCUMENTS

| | | |
|---|---|---|
| JP | 2001-127129 | 5/2001 |
| JP | 2002-310962 | 10/2002 |
| JP | 2004-294360 | 10/2004 |

* cited by examiner

*Primary Examiner*—Charles R Kasenge
(74) *Attorney, Agent, or Firm*—McDermott Will & Emery LLP

(57) ABSTRACT

An automatic defect review and classification system including at least one automatic defect review apparatus for specifically observing defect portions of a sample and at least one automatic defect classification apparatus for automatically classifying the defects, the system further comprising a device which outputs a status for combination of the automatic review apparatus and the automatic defect classification apparatus.

2 Claims, 6 Drawing Sheets

FIG.5

| 502 | ADR MODE | HIGH SPEED ▼ | |
|---|---|---|---|
| 503 | IMAGING CONDITION | FOCUS | NO. OF ADDITION |
| | LOW MAGNIFI-CATION DEFECT | OFF ▼ | 16 ▼ |
| | LOW MAGNIFI-CATION REFERENCE | — ▼ | 16 ▼ |
| | HIGH MAGNIFI-CATION DEFECT | ON ▼ | 32 ▼ |
| 504 | OBJECT HISTORY | 100 ▼ | |

| 505 | ADR THROUGH-PUT | |
|---|---|---|
| | ADR MEAN | 1800 DPH ▼ |
| | ADR MAXIMUM | 1900 DPH ▼ |
| | ADR MINIMUM | 1700 DPH ▼ |

| 506 | ADC THROUGH-PUT | |
|---|---|---|
| | ADC MEAN | 400 DPH ▼ |
| | ADC MAXIMUM | 450 DPH ▼ |
| | ADC MINIMUM | 350 DPH ▼ |

CLOSE

AUTOMATIC DEFECT REVIEW AND CLASSIFICATION SYSTEM

RELATED APPLICATIONS

This application is a Continuation of U.S. application Ser. No. 11/451,330, filed Jun. 13, 2006, claiming priority of Japanese Application No. 2005-172808, filed Jun. 13, 2005, the entire contents of each of which are hereby incorporated by reference.

BACKGROUND OF THE INVENTION

This invention relates to an automatic defect review and classification system. More specifically, the invention relates to a system that reviews and acquires defect images occurring in a semiconductor production process and classifies the defects in accordance with their kind.

To improve a production yield of semiconductor devices, it is very important to discover in an early stage the defects occurring in the semiconductor production process and to take counter-measures for the defects. The defects that may affect the production yield have become diversified in recent years with miniaturization of semiconductor devices and the number and kind of defects to be confirmed increase.

Therefore, an ADR/ADC defect inspection system having functions of an automatic defect review (hereinafter called "ADR") for automatically acquiring defect images and an automatic defect classification (hereinafter called "ADC") for automatically classifying the defects in accordance with their kind on the basis of the defect images acquired has been proposed (refer to JP-A-2001-127129, for example).

In the ADR/ADC system disclosed in the patent document 1 described above, when the defect classification processing by the ADC is not completed before the start of image acquisition of next defects after completion of image acquisition by the ADR, the processing by the ADC becomes a bottleneck and invites the drop of through-put of the entire ADR/ADC system.

Recently, the processing time about the ADR has been gradually reduced through speed-up of a sample stage, improvement of an imaging system such as speed-up of an auto-focus function or by the introduction of a high speed mode that lays stress on the through-put. Therefore, the problem that the processing of the ADC cannot catch up with ADR remains unsolved.

SUMMARY OF THE INVENTION

It is an object of the invention to provide an automatic defect review and classification system capable of preventing the drop of through-put of an entire ADR/ADC system owing to the delay of ADC.

According to one aspect of the invention, there is provided an automatic defect review and classification system including at least one automatic defect review apparatus for specifically observing defect portions of a sample and automatically acquiring images and at least one automatic defect classification function for automatically classifying the defects by using the images acquired by the ADR apparatus in accordance with the kind of the defects, wherein one automatic defect review apparatus is used in combination with a plurality of automatic defect classification apparatuses.

The automatic defect review and classification system preferably includes means for providing the combination of the ADR apparatus with the ADC apparatuses providing the highest through-put of the automatic defect review and classification system as a whole or means for providing the combination that makes the difference between through-put of the ADR apparatus and through-put of the ADC apparatus minimal.

The automatic defect review and classification system has its feature in that setting itself is changed in accordance with a manual change in GUI display about the selection of the ADC apparatus. In this case, the system has another feature in that the apparatus not executed among the ADR apparatus and the ADC apparatus is displayed on the GUI. Consequently, the selection object by a manual operation can be easily known by displaying the ADR and the ADC that are not executed.

As still another feature, the automatic defect review and classification system includes means for calculating and providing an estimation value of a time necessary for a processing to be next executed on the basis of a past processing history corresponding to a set imaging condition as to the function of each of the automatic defect review apparatus and the automatic defect classification apparatus. The system preferably includes means for deciding and providing without delay an ADC apparatus necessary for the ADC processing to one set of ADR apparatus on the basis of the estimation value calculated. The system has still another feature in that the estimation value is estimated by taking the difference of a processing time resulting from the difference of a specification of an information processing unit provided to each of the ADR/ADC into consideration. Consequently, because updating is made by the latest data whenever the data is acquired, it becomes possible to flexibly cope with the change of the processing time due to the exchange of the PCs and version-up of software.

The system has still another feature in that as to which of the information processing units is used, a combination is selected from 1) a combination that makes the number of sets of PCs used minimal and selects those PCs which have high processing capacity and 2) a combination that reduces as much as possible an over-specification as to the capacity and saves waste.

The system has still another feature in that the system has the function of setting priority representing the order of processing when at least one of the functions of the ADR apparatus and the ADC apparatus is executed.

The system has still another feature in that when a processing by a first ADR/ADC system having high priority is executed, control is so made as to select and use a second ADC apparatus having a higher processing capacity than a first ADC apparatus in the first ADR/ADC from among the second ADR/ADC system that is under execution and has low priority.

The system has still another feature in that the processing of the second ADC apparatus in the second ADR/ADC system includes means for estimating the delay of a processing finish time of the second ADR/ADC system associated with interruption and displaying the change of the finish time estimated.

In consequence, the user can acquire the information of the time associated with the change, and so forth.

According to another aspect of the invention, there is provided a method for deciding a combination of apparatuses in an automatic defect review and classification system including at least one automatic defect review apparatus (hereinafter called "ADR apparatus") for specifically observing defect portions of a sample and automatically acquiring images and at least one automatic defect classification function (hereinafter called "ADC apparatus") for automatically classifying the defects by using the images acquired by the ADR apparatus in accordance with the kind of the defects, the method comprising the steps of setting an ADR mode, an imaging condition and the number of cases of processing; retrieving an ADR processing time (through-put) from a past history on the basis of the setting and calculating the ADR processing time by appropriately correcting through-put; and deciding a combination of ADCs necessary for executing an ADC processing without delay to ADR through-put.

The automatic defect review and classification system according to the invention can prevent the drop of through-put of an entire ADR/ADC system when the processing of ADCs cannot catch up with ADR by connecting a necessary number of ADCs to one ADR. In this instance, a processing time under various conditions is estimated from the past processing history and the necessary number of ADCs can be known from the estimation value. Because the processing time is estimated from the past processing history, estimation efficiency becomes higher and the processing time for the estimation becomes shorter, too.

Other objects, features and advantages of the invention will become apparent from the following description of the embodiments of the invention taken in conjunction with the accompanying drawings.

BRIEF DESCRIPTION OF THE DRAWINGS

FIG. 5 is a view showing a display screen example of GUI for estimating a processing time from a past processing history;

DESCRIPTION OF THE INVENTION

Figure 1:
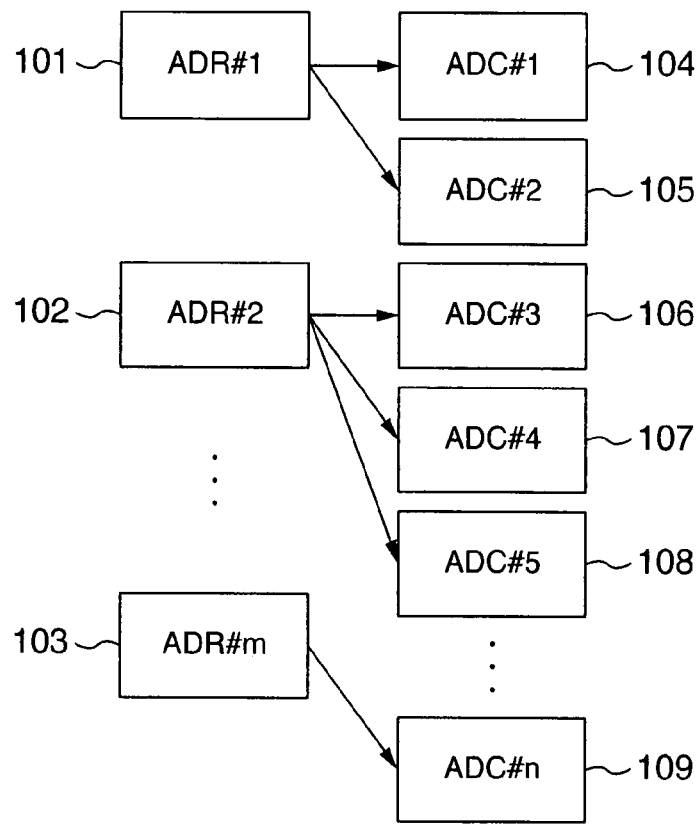
FIG. 1 is a block diagram showing a structural example of an ADR/ADC system according to an embodiment of the invention, wherein n sets of ADC are connected to m sets of ADR.
Figure 2:
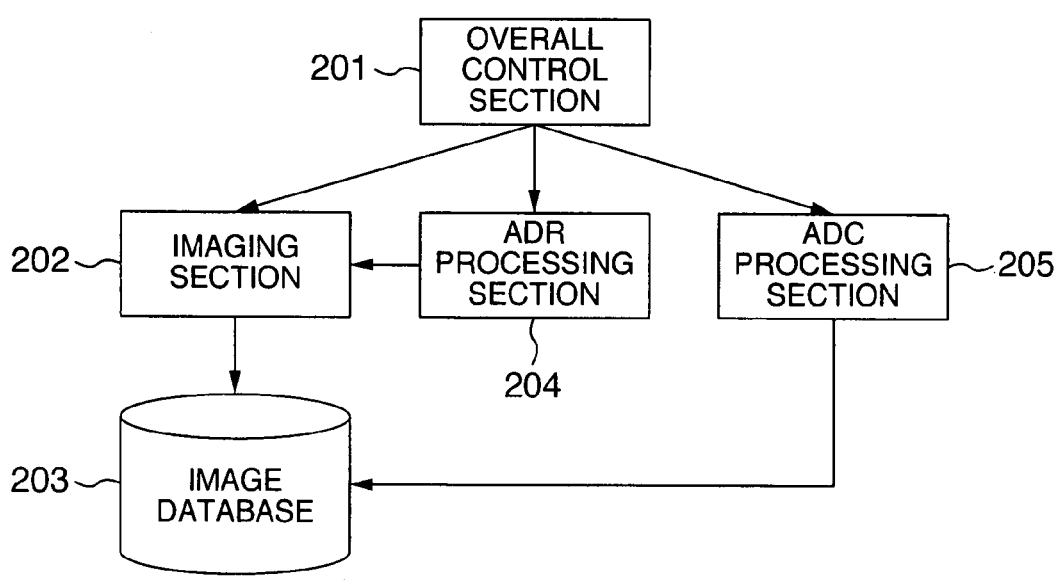
FIG. 2 is a block diagram showing a basic structural example of an ADR/ADC system of this embodiment.
Figure 3:
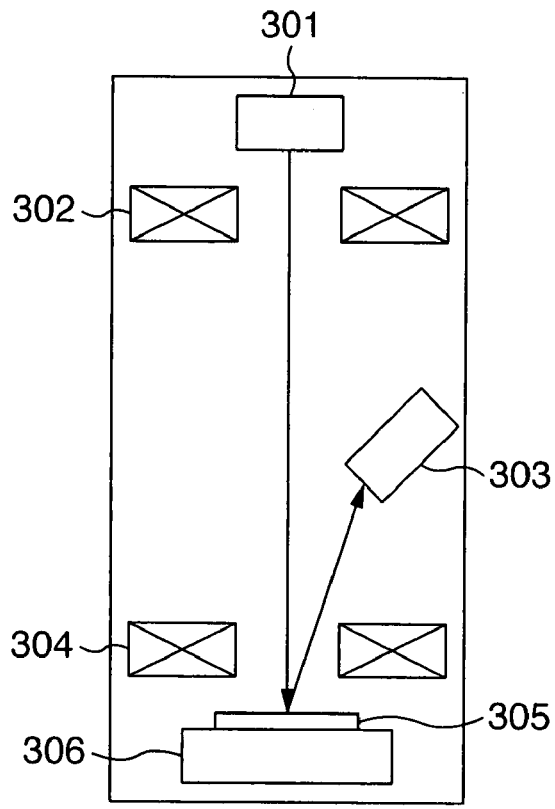
FIG. 3 is a sectional view showing a basic structural example of an SEM system imaging section according to the embodiment.

In this specification, an automatic defect acquisition apparatus and an automatic defect classification apparatus will be abbreviated as "ADR" and "ADC", respectively. An automatic defect review and classification technology according to one embodiment will be hereinafter explained with reference to the accompanying drawings. FIG. 1 shows a structural example of an ADR/ADC system used for automatic defect review and classification according to one embodiment of the invention. FIG. 2 is a block diagram showing a basic structural example of the ADR/ADC system. FIG. 3 is a sectional view showing a basic construction of an SEM system imaging section.

The ADR/ADC system according to this embodiment includes an imaging section 202, an image database 203, an ADR processing section 204, an ADC processing section 205 and an overall controlling section 201 as shown in FIG. 2. The imaging section 202 takes defect images in accordance with instructions and information from the overall controlling section 201 and from the ADR processing section 204, and preserves the image data associated with the defect images in the image database 203. Receiving the instruction from the overall controlling section 201, the ADC processing section 205 classifies the images stored in the image database 203 in accordance with the kind of defects.

FIG. 3 is a sectional view of the SEM system imaging section 202 (FIG. 2). The electron beam irradiated from an electron gun 301 is converged and irradiated by a convergent lens 302 and an objective lens 304 in such a manner as to place the focus on a sample 305 that is put and position-controlled on a sample stage 306.

Secondary electrons and reflected electrons develop from the sample 305 to which the electron beam is irradiated. These electrons are detected by a detector 303. The electrons so detected by the detector 303 are converted to electric signals and further to image signals.

Figure 4:
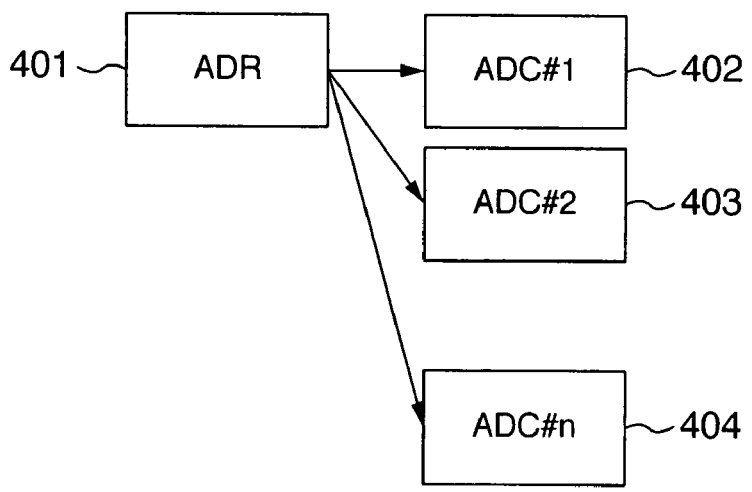
FIG. 4 is a block diagram showing an example where a plurality of ADC systems is connected to 11 sets of ADR systems.

FIG. 4 is a block diagram showing a structural example where n sets of ADC (#1) 402, (#2) 403, ..., (#n) 404 are connected to one set of ADR 401. Assuming that the ADR system can acquire 1,800 defect images per hour, through-put of the ADR 401 is 1,800 DPH. The number of defects that can be processed per hour is expressed by DPH as the unit of through-put. When through-put per ADC is 400 DPH at this time, at least five ADCs (400 DPH×5 sets→2,000 DPH≧1, 800 DPH) are necessary to keep through-put of the entire ADR/ADC system at 1,800 DPH.

In this embodiment, each ADR 401 and each ADC 402 are accomplished by a personal computer (PC), respectively. In the example given above, the ADR/ADC system is constituted by six PCs, that is, one PC for the ADR processing and five PCs for the ADC processing.

FIG. 1 is a block diagram showing a structural example of the ADR/ADC system according to this embodiment where n sets of ADCs 104, 105, 106, 107, 108, 109, ... are connected to m sets of ADRs 101, 102, 103, and so forth. In FIG. 1, two sets of ADCs 104 and 105 are shown connected to ADR 101 and three sets of ADCs 106 to 108 are connected to ADR 102. However, this connection is merely illustrative and the combination of connection is arbitrary. The connection can be achieved by the later-appearing method by which through-put becomes the fastest. To decide the combination providing the highest through-put, correct calculation of an estimated processing time is necessary.

In the standard ADR, a low magnification defect image having a wide visual field and a low magnification reference image as a normal pattern are acquired and a defect position is detected from these images. A high magnification defect image is acquired with this defect position as the center. In contrast, when a periodical pattern is handled as the object, a high speed mode for detecting the defect position from only the low magnification defect image without acquiring the low magnification reference image and then acquiring the high magnification image can be utilized by utilizing periodicity of the periodical pattern. Furthermore, when the defect position information is correct, the highest speed mode for directly acquiring the high magnification image without acquiring the low magnification image is available. Incidentally, through-put varies depending on the kind of auto-focus for acquiring each image, the existence/absence of the auto-focus and the difference of the image accumulation number in the case of the SEM image.

The ADC processing time varies with the condition of ADR, too. The specification of the PCs used, particularly the difference of a CPU and the memory capacity mounted to the PCs, affects the ADR and ADC processing time. A method for correctly estimating the processing time from the past processing history in the ADR/ADC system in which the processing time greatly varies depending on the mode and on setting will be explained by way of example with reference to FIG. 5.

FIG. 5 shows an example of GUI for estimating the processing time from the past processing history. The GUI 501 sets and displays an estimated time in the ADR/ADC system calculated from the set content and the past processing history as shown in FIG. 5. Reference numeral 502 denotes an area to which the ADR mode is set. In the example shown in FIG. 5, the mode for acquiring three kinds of modes, that is, a low magnification defect image, a low magnification reference image and a high magnification defect image, is the standard mode. The mode for acquiring only the low magnification defect image and the high magnification defect image without acquiring the low magnification reference image is set to the high speed mode. The mode for acquiring only the high magnification defect image without acquiring the low magnification defect image and the low magnification reference image is set to the highest speed mode. The high speed mode is selected and displayed in FIG. 5. Reference numeral 503 denotes an area to which an imaging condition is set. The focus can be set to ON, OFF and "–" (no image acquisition) as the imaging condition. An image addition number in the case of the SEM image is set as the addition number of the imaging condition. In reference numeral 504, the latest history as the object of the calculation of the processing time is set by the defect number. When "100" is set as shown in the drawing, the processing time is calculated on the basis of the processing cases of 100 defects from the latest processing case.

In the area denoted by reference numeral 505, the ADR processing time is calculated from the past history and displayed. The unit of the calculation value of each of an ADR mean, maximum and minimum is selected from DPH or second/defect.

In the area denoted by reference numeral 506, the ADC processing time is calculated from the past history and displayed. The unit of the calculation value is selected from DPH or second/defect. The estimation value of the processing time from such a past processing history is calculated in each ADR/ADC unit, or in the PC unit in this embodiment. Consequently, correct estimation inclusive of not only the difference of the processing time resulting from the set condition but also the difference of the specification of PCs can be made.

An object history 504 represents how many defects from the latest processing history should be retrogressively handled as the object of the calculation of the processing time. Because updating is made by the latest data whenever the data is acquired, counter-measures can be flexibly taken against the change of the processing time owing to the exchange of the PCs or version-up of software.

When the difference between the maximum and the minimum is markedly great in the area denoted by reference numeral 505 or 506, for example, it is possible to assume that the processing time drastically changes owing to the exchange of the PCs or version-up of software. In such a case, the object history of 504 is again set to a smaller value. In consequence, since only the actual record of the processing after fluctuation becomes the object, the processing time can be more accurately estimated.

In the display shown in FIG. 5, the estimation time is calculated on the basis of the setting described above and the number of sets of ADC necessary for executing the ADC processing without delay for one set of ADR is decided and can be submitted in the following way.

Figure 6:
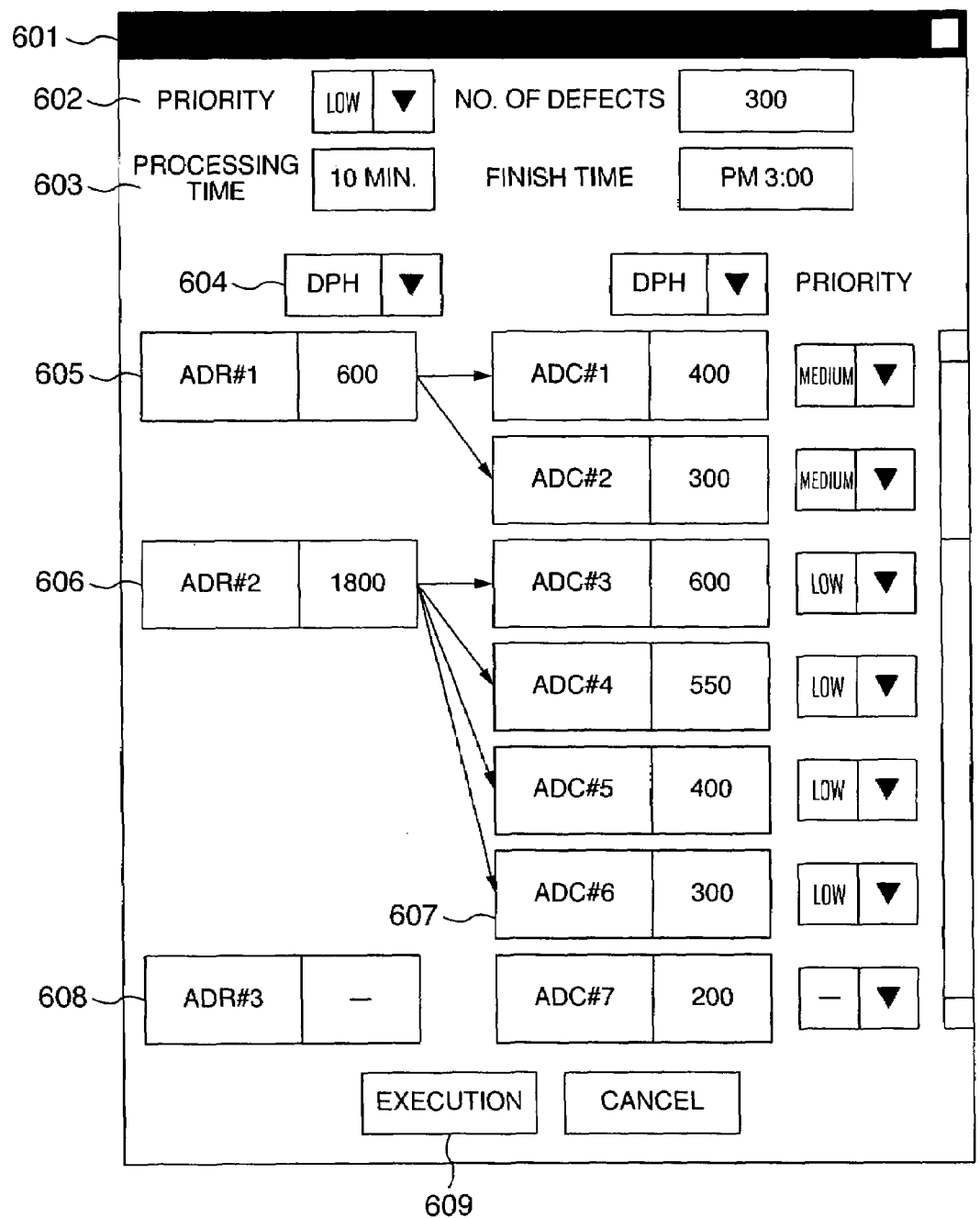
FIG. 6 is a view showing a display screen example of GUI showing a connection example of an ADR/ADC system achieving the fastest through-put.

In FIG. 6, a plurality of sets of ADR/ADC systems is introduced and the drawing shows an example of a GUI display screen 601 for displaying the combination of the ADCs that provides the fastest through-put. Reference numeral 602 denotes an area to which priority of the later-appearing ADR/ADC is set. Reference numeral 603 denotes an area for displaying the number of defects (300 in the drawing) of the ADR/ADC object, the estimated processing time (10 minutes in the drawing) and the estimated finish time (PM 3:00 in the drawing). Reference numeral 604 denotes an area to which a display unit of the estimated through-put is set (DPH in the drawing). Reference numeral 605 represents that ADC #1 of 400 DPH and ADC #2 of 300 DPH have already been under execution for ADR #1 of 600 DPH.

Reference numeral 606 provides the combination of ADCs that makes through-put of the overall ADR/ADC system the fastest for ADR #2 of 1800 DPH to be executed from now on. Because the estimated through-put of ADR #2 is 1800 DPH, the combination that makes the sum of the through-put of the entire ADR/ADC system at least 1800 DPH should be selected. In this example, to minimize the overhead time such as overhead of communication, an algorithm that selects the combination making the number of sets of PCs to be connected minimal is employed. In other words, because ADCs are serially selected from those having high processing capacity (having a greater DPH numerical value in the case of display in the DPH unit), ADC #6 but not ADC #7 is selected as the fourth ADC.

When another algorithm is employed such as when the condition that makes the difference between through-put of ADR and through-put of ADC minimal is used, ADC #7 is selected in place of ADC #6 as the fourth ADC. As to the selection of ADC, the user can manually make the change by changing the connection destination of arrow 607 on GUI. Setting itself is changed in accordance with the manual change for the selection of ADC. An area denoted by reference numeral 608 represents ADR and ADC that are not executed or in other words, ADR #3 and ADC #7. The manual selection object can be readily seen by displaying ADR and ADC not executed as described above. As to which of the seven PCs is used, the PC can be selected from 1) the combination that makes the number of sets of PC used minimal and selects PC having higher capability and 2) the combination that reduces an over-specification as much as possible to save waste.

The combination of ADR/ADC to be used is decided in the way described above. After setting, an execution button denoted by reference numeral 609 is pushed and the processing by ADR/ADC is started.

Figure 7:
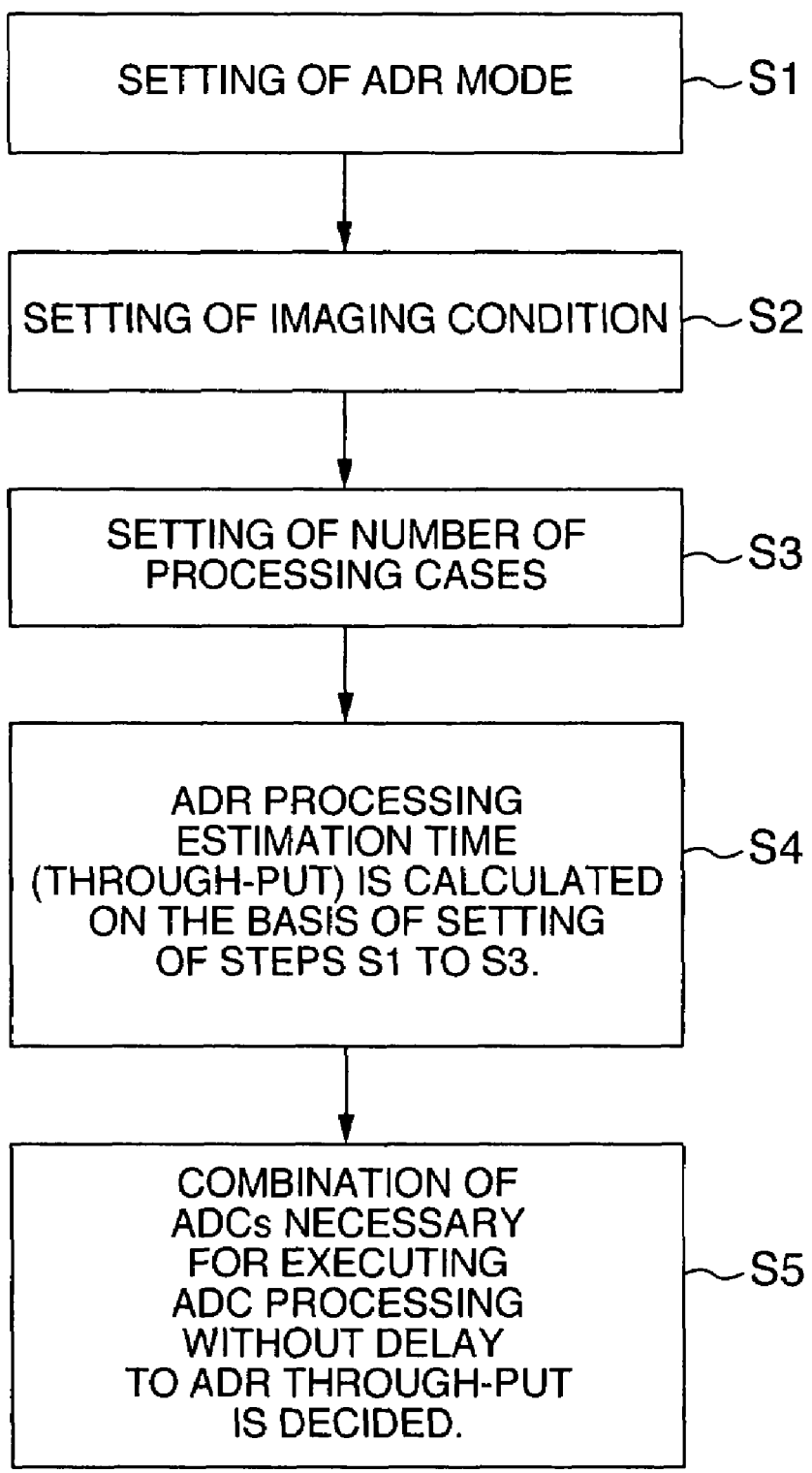
FIG. 7 is a flowchart showing the flow of processing for deciding the combination of ADR/ADC used for the ADR/ADC system of the embodiment.

FIG. 7 is a flowchart showing the flow of processing for deciding the combination of ADR/ADC used for the ADR/ADC processing in this embodiment. To begin with, an ADR mode is set in Step S1. In the next Step S2, an imaging condition is set. The number of processing cases is set in Step S3. In Step S4, the ADR processing time (through-put) is retrieved from the past history on the basis of setting of Steps S1 to S4 and calculation is made with appropriate correction.

In the next Step S5, the combination of ADC for executing the ADC processing without delay to the ADR through-put is decided.

Figure 8:
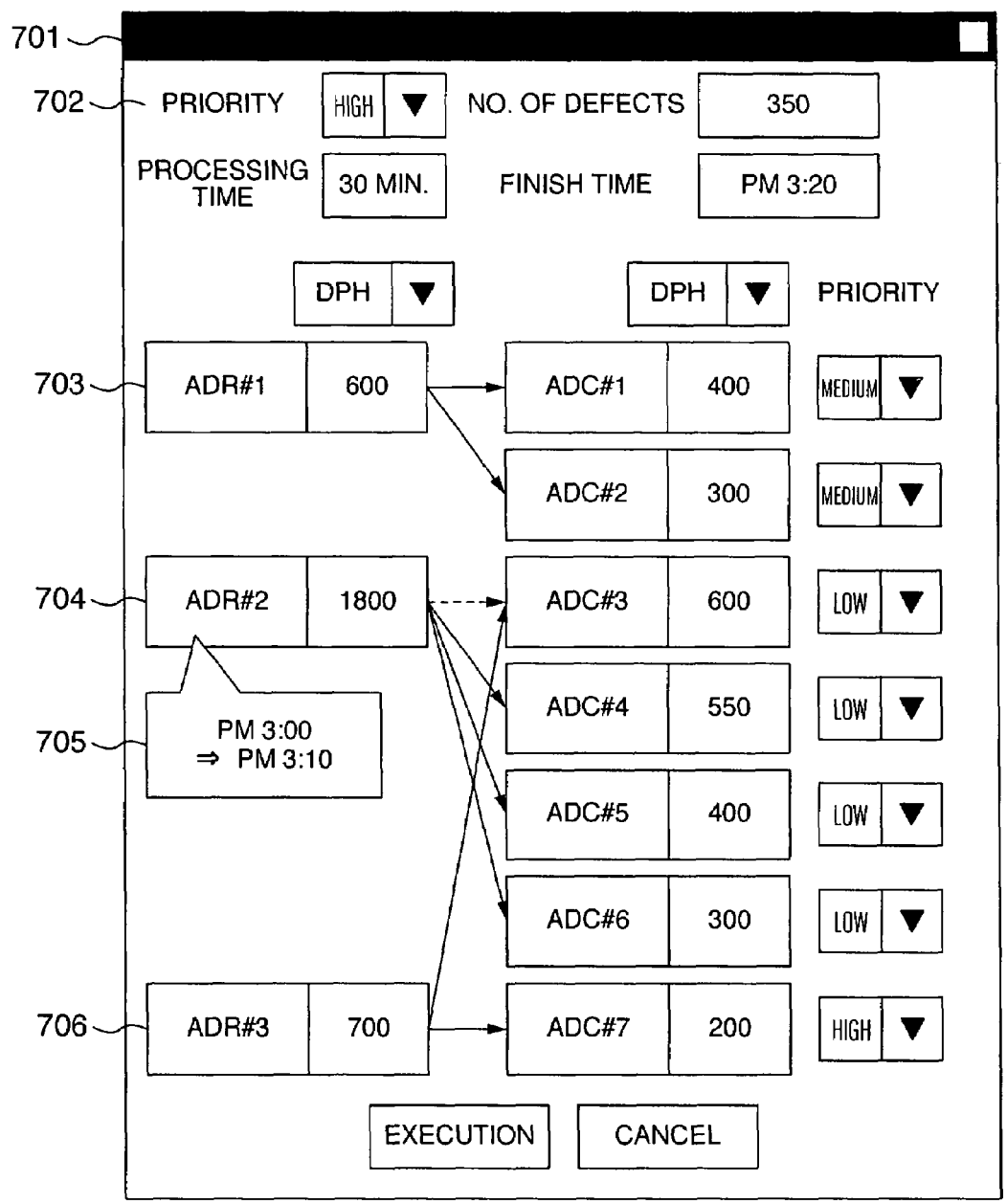
FIG. 8 is a view showing a display screen example showing a connection example of the ADR/ADC system when preferential processing is executed from an ADR/ADC system having higher processing priority.

Next, the priority of the ADR/ADC processing will be explained with reference to FIG. 8. A screen 701 is GUI in which a plurality of ADR/ADC systems is introduced in the same way as in FIG. 6 and which displays the combination of ADC providing the fastest through-put of ADR/ADC to be executed from now on. Reference numeral 702 denotes an area to which the priority of ADR/ADC is set. In the example shown in FIG. 8, the priority is set to "high". The number of defects, the processing time and the end time are also displayed.

Reference numeral 703 denotes the combination of the ADR#1 that has already been under execution, ADC #1 and ADC #2 and the priority is set to "medium". Reference numeral 704 denotes the combination of ADR #2 that has already been under execution, ADC #3, ADC #4, ADC #5 and ADC #6 and the priority is "low".

Reference numeral 706 denotes the processing that is scheduled to be executed from now and represents the combination of ADR #3 with ADC #7 in which the priority is set to "high". The estimated through-put of ADR #3 is 700 DPH. It can be understood that the ADC processing cannot catch up with ADR by using ADC #7 alone that has through-put of 200 DPH and is not under execution at present. It is therefore submitted that the processing associated with ADC #3 having low priority is interrupted and ADC #3 is used for ADR #3 having high priority.

To preferentially execute ADR/ADC having higher priority, this embodiment employs the algorithm for serially selecting ADR/ADC having a higher processing capacity (having a larger numerical value when displayed in the DPH unit) from among ADR/ADCs having the lowest priority among ADR/ADCs under execution at present. Therefore, ADC #3 having low priority and high DPH is selected from among ADC #3, ADC #4, ADC #5 and ADC #6. Because the processing of ADC #3 for ADR #2 is interrupted with this selection, the finish time for ADR #2 gets retarded. Reference numeral 705 represents the change of the estimated finish time resulting from this delay. Reference numeral 705 represents that the change is made so that the schedule time of the processing for ADR #2 is delayed by 10 minutes from PM 3:00 to PM 3:10. When such a change from the schedule time exists, this change is preferably notified to the user through an alarm, for example. In this embodiment, since a plurality of ADCs can be connected to ADR under the condition where the processing cannot catch up one ADR by one ADC alone and the through-put of the entire ADR/ADC system drops, the drop of through-put can be prevented.

The number of cases where a plurality of ADR/ADC systems is introduced into one production line has increased in recent years as the ADR/ADC system has become wide spread. When a plurality of ADR/ADC systems is introduced in this way, the user must decide the combination of ADCs with ADR so that through-put becomes the fastest in consideration of the apparatus specification of these ADR/ADC systems and their setting condition. This has been a burden to the user. In this embodiment, the processing time can be estimated from the past processing record while the differences of the apparatus specification and the set condition are taken into account and the combination of ADCs with ADR is automatically calculated in the direction providing the highest through-put on the basis of this correct estimation processing time. Therefore, the burden to the user can be drastically reduced.

An ADC of the type which independently classifies the images by using images acquired in the past without synchronization with ADR is called "off-line ADC" in contrast to so-called "real time ADC" which executes ADC while acquiring images by ADR. Generally, the real time ADC must calculate and provide the classification result literally on the real time basis whereas the off-line ADC is executed in many cases by utilizing the empty time in which the real time ADC is not executed.

In semiconductor production lines, the priority of execution is often different in the same real time ADC between samples called "super-express lot" and ordinary samples. In the ADR/ADC system in this embodiment, the priority can be set to each ADR processing and to each ADC processing, and processing is preferentially executed from those which have higher priority. Consequently, the embodiment provides the advantage that a plurality of ADR/ADC systems can be efficiently operated.

As explained above, this embodiment can correctly estimate the processing time under various conditions from the past processing history and can connect a necessary number of ADCs to one ADR on the basis of the estimation value. Therefore, the embodiment can prevent the problem that through-put of the entire ADR/ADC system drops because the processing of ADC cannot catch up the ADR processing.

The invention can be utilized for an automatic defect review and classification system of a semiconductor production line.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An automatic defect review and classification system including at least one automatic defect review apparatus (hereinafter called "ADR apparatus") for specifically observing defect portions of a sample and automatically acquiring images and at least one automatic defect classification apparatus (hereinafter called "ADC apparatus") for automatically classifying the defects by using the images acquired by said ADR apparatus in accordance with the kind of the defects, the system further comprising:
   a computer which outputs a status for combination of said ADR apparatus and said ADC apparatus to a graphical user interface (hereinafter called "GUI");
   wherein the computer calculates and displays an ADR processing time from a past history;
   wherein the computer calculates and displays an ADC processing time from the past history;
   wherein the computer calculates an estimation time on the basis of the calculated ADR and ADC processing times;
   wherein the computer decides and displays a number of sets of ADC necessary for executing an ADC processing without delay for one set of ADR on the basis of the calculated estimation time; and
   wherein said ADC apparatus to be connected to said ADR apparatus can be changed manually on the GUI.

2. An automatic defect review and classification system according to claim 1, wherein a connection of the ADR apparatus and the ADC apparatus is represented by an arrow on the GUI, and the ADC apparatus can be changed manually by changing a connection destination of the arrow.

* * * * *